(12) United States Patent
Binns

(10) Patent No.: US 6,189,022 B1
(45) Date of Patent: *Feb. 13, 2001

(54) SLACK SCHEDULING FOR IMPROVED RESPONSE TIMES OF PERIOD TRANSFORMED PROCESSES

(75) Inventor: Pamela A. Binns, North Oaks, MN (US)

(73) Assignee: Honeywell International Inc., Morristown, NJ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/914,924

(22) Filed: Aug. 20, 1997

(51) Int. Cl.$^7$ .................................................. G06F 9/00
(52) U.S. Cl. .............................................................. 709/100
(58) Field of Search ................................... 709/101, 102, 709/104, 103, 100

(56) References Cited

U.S. PATENT DOCUMENTS

| | | | |
|---|---|---|---|
| 3,648,253 | 3/1972 | Mullery et al. | 340/172.5 |
| 5,408,663 | 4/1995 | Miller | 395/650 |
| 5,560,032 | 9/1996 | Nguyen et al. | 395/800 |
| 5,566,177 | 10/1996 | Bhandari et al. | 370/85.5 |
| 5,630,096 | 5/1997 | Zuravleff et al. | 395/481 |

OTHER PUBLICATIONS

Audsley, N.C., et al., "Fixed Priority Pre-emptive Scheduling: An Historical Perspective", *Real-Time Systems, 8*, 1995 Kluwer Academic Publishers, Boston, 173–198, (1995).

Bettati, R. et al., "End-to-End Scheduling to Meet Deadlines in Distributed Systems", *Proceedings of the 12th International Conference on Distributed Computing Systems*, 452–459, (Jun. 1992).

Binns, P., "Incremental Rate Monotonic Scheduling for Improved Control System Performance", *Real–Time Applications Symposium*, Honeywell Technology Center, 11 pgs., (Jun. 1997).

Binns, P., "Scheduling Slack in MetaH", *Real–Time Systems Symposium, Work in Progress Session*, Honeywell Technology Center, 4 pgs., (Dec. 1996).

Binns, P., et al., "Precedence Constrained Fixed Priority Scheduling with Solutions to Some Practical Problems", Honeywell Technology Center; Submitted to RTSS '99, (1999).

Garcia, J.J., et al., "Optimized Priority Assignment for Tasks and Messages in Distributed Hard Real–Time Systems", *IEEE*, 124–132, (1995).

Gerber, R., et al., "Semantics–Based Compiler Transformations for Enhanced Schedulability", *IEEE*, 232–242, (1993).

Gertz, M.W., et al., "A Human–Machine Interface to Support Reconfigurable Software Assembly for Virtual Laboratories", *IEEE Robotics and Automation Magazine*, 1–8, (Dec. 1994).

(List continued on next page.)

*Primary Examiner*—Majid Banankhah
(74) *Attorney, Agent, or Firm*—John G. Shudy, Jr.

(57) ABSTRACT

A method for scheduling periodic incremental and design to time processes. The algorithm is based on the slack stealer which dynamically determines the remaining slack time after all periodic processes are scheduled utilizing Rate Monotonic Scheduling (RMS). An incremental process determines how much execution time is available after the baseline component has completed and prior to the execution of a process increment. A design to time process determines how much execution time is available before the process begins execution and selects a version which gives the greatest precision in the available time. For both incremental and design to time processes, a minimum amount of time is statically reserved so that an acceptable but suboptimal solution will always be calculated. The solution identifies and proposes solutions for the practical problem of supporting criticalities when scheduling slack and analyzing the run-time overheads.

28 Claims, 9 Drawing Sheets

OTHER PUBLICATIONS

Gillies, D.W., et al., "Scheduling Tasks with and/or Precedence Constraints", *Siam J. Comput.*, 24, 1995 Society for Industrial and Applied Mathematics 797–810, (Aug. 1995).

Harbour, M.G., et al., "Fixed Priority Scheduling of Periodic Tasks with Varying Execution Priority", *IEEE*, 116–128, (1991).

Johnson, M., "Boeing 777 Airplane Information Management System—Philosophy and Displays", Honeywell, Inc. Air Transpost Systems, Phoenix, Arizona, USA, 8 pgs.

Lehoczky, J., et al., "The Rate Monotonic Scheduling Algorithm: Exact Characterization And Average Case Behavior", *IEEE*, 166–171, (1989).

Lehoczky, J.P., "Fixed Priority Scheduling of Periodic Task Sets with Arbitrary Deadlines", *IEEE*, 201–209, (1990).

Lehoczky, J.P., et al., "An Optimal Algorithm for Scheduling Soft–Aperiodic Tasks in Fixed–Priority Preemptive Systems", *IEEE*, 110–123, (1992).

Lehoczky, J.P., et al., "Enhanced Aperiodic Responsiveness in Hard Real–Time Environments", *IEEE*, 261–270, (1987).

Leung, J.Y., et al., "On the Complexity of Fixed–Priority Scheduling of Periodic, Real–Time Tasks", *Performance Evaluation 2*, North–Holland Publishing Company, 237–250, (1982).

Liu, C.L., et al., "Scheduling Algorithms for Multiprogramming in a Hard–Real–Time Environment", 46–61, (Jan. 1973).

Luqi, "Real–Time Constraints In a Rapid Prototyping Language", *Computer Lang., vol. 18, No. 2*, Computer Science Department. Naval Postgraduate School. Monterey. CA. 93943. USA, 77–103, (1993).

McConnell, D.J., et al., "Reengineering a Single Threaded Embedded Missile Application Onto a Parallel Processing Platform Using MetaH", *IEEE, Proceedings of the 4th WPDRTS*, 57–64, (1996).

Mok, A.K., et al., "Synthesis of a Real–Time Message Processing System with Data–driven Timing Constraints", *IEEE*, 133–143, (1987).

Saksena, M., et al., "Design and Implementation of Maruti–II", in *Principles of Real–Time Systems, Sang Son Ed.*, Chapter 4, (1994).

Saksena, M., et al., "Guidelines for Automated Implementation of Executable Object Oriented Models for Real–Time Embedded Control Systems", *IEEE*, 240–251, (1997).

Sha, L., et al., "Priority Inheritance Protocols: An Approach to Real–Time Synchronization", *IEEE Transactions On Computers, 39*, 1175–1185, (Sep. 1990).

Sha, L., et al., "Solutions For Some Practical Problems In Prioritized Preemptive Scheduling", *IEEE*, 181–191, (1986).

Sprunt, B., et al., "Exploiting Unused Periodic Time For Aperiodic Service Using The Extended Priority Exchange Algorithm", *IEEE*, 251–258, (1988).

Spuri, M., et al., "How to Integrate Precedence Constraints and Shared Resources in Real–Time Scheduling", *IEEE Transactions on Computers, 43*, 1407–1412, (Dec. 1994).

Stoyenko, A.D., "A Schedulability Analyzer for Real–Time Euclid", *IEEE*, 218–227, (1987).

Sun, J., et al., "Synchronization Protocols in Distributed Real–Time Systems", *IEEE*, 38–45, (1996).

Vestal, S., "Fixed–Priority Sensitivity Analysis for Linear Compute Time Models", *IEEE Transactions on Software Engineering, 20*, 308–317, (Apr., 1994).

Vestal, S., "MetaH Support for Real–Time Multi–Processor Avionics", Joint Workshop on Parallel and Distributed Real–Time Systems, Geneva, Switzerland, 10 pgs., (Apr. 1997).

Vestal, S., "Mode Changes in a Real–Time Architecture Description Language", *Second International Workshop on Configurable Distributed Systems*, 11 pgs., (Mar. 1994).

Vestal, S., et al., "Scheduling and Communication in MetaH", *Proceedings of the Real–Time Systems Symposium*, Raleigh–Durham, NC, 7 pgs., (Dec. 1993).

Xu, J., et al., "Scheduling Processes with Release Times, Deadlines, Precedence, and Exculsion Relations", *IEEE Transactions on Software Engineering, 16*, 360–369, (Apr., 1994).

"A feasibility test for scheduling tasks in a distributed hard real–time systems", M Chetto, H. Chetto, APII vol. 24, 1990, pp. 239–252, Copyright AFCET 1990.*

* cited by examiner

Periodic Process Specification

| Notation | Description |
|---|---|
| $r_i$ | Process with priority level $i$, $r_i$ may be a transformed process. |
| $T_i$ | The time between dispatches of $r_i$. |
| $r_{ij}$ | The $j^{th}$ dispatch of $r_i$. |
| $n$ | The total number of tasks in the periodic task set. |
| $D_{i,j}$ | The deadline for $r_{ij}$. We consider only the case when $D_{ij}$ is the dispatch time for the $(j+1)^{st}$ dispatch of $r_i$. More specifically, we consider only the case when $D_{ij} = jT_i$, or when all phasings are zero and there are no preperiod deadlines. |
| $r_i'$ | The criticality of $r_i$. $r_i' = i$ if the process set has not been transformed, assuming processes are labeled such that $T_1 \leq T_2 \leq \ldots \leq T_n$. |
| $p_i$ | The process priority, a derived quantity. If the process set has not been transformed then $r_i' = p_i$ for $1 \leq i \leq n$. |
| $T_i'$ | $r_i$'s transformed period. |
| $t_i$ | $r_i$'s transform factor, an integer such that $T_i' \cdot t_i = T_r$. |
| $C_i(j)$ | The worst case execution time of the $j^{th}$ - "sized" algorithm for a design-to-time process, $r_i$. It is assumed that $C_i(1) < C_i(2) < \ldots < C_i(n_i)$, and that the precision of the result of $C_i(j)$ is greater than the precision of the result of $C_i(k)$ for $n_i \geq j > k \geq 1$. |
| $C_{b,i}$ | Process $r_i$'s execution time to be used in the off-line RMA feasibility analysis. If $r_i$ is an ordinary periodic task, then it has no increments and this is the worst case execution time of the entire process. If $r_i$ is an incremental process, then this is the worst case execution time of the baseline component. If $r_i$ is a design-to-time process, this is the worst case execution time of the "smallest" size problem (i.e., $C_i(1)$). |
| $C_{b,i}'$ | Process $r_i$'s transformed execution time. In symbols, $C_{b,i}' = C_{b,i}/t_i$. |
| $C_{inc,i}$ | Process $r_i$'s incremental execution time. $C_{b,i} \neq C_{inc,i}$, necessarily. Note that process increments are not transformed. |

Table 1

Slack Variables Definitions

| Notation | Description |
| --- | --- |
| $F_{ij}$ | The latest completion time for $r_{ij}$, a static value. |
| $L_{ij}$ | The amount of level $i-1$ slack available in $[0, D_{ij}]$ which is the amount of time not spend processing $r_1, r_2, ..., r_{i-1}$. |
| $A_{ij}$ | The amount of level timeline $i$ slack in $[0, F_{ij}]$. This quantity is computed statically. |
| $A_i(t)$ | The level $i$ consumed slack in $[0, t]$. Frequently the $t$ is dropped, and it is understood that $t$ is defined by the current time. |
| $I_i(t)$ | The amount of level $i$ idle time consumed in $[0, t]$. |
| $E_i(t)$ | The dispatch id of the next instance of $r_i$ to complete. If $r_i$ is active, this is the current instance, otherwise it is the next instance. If $r_i$ is period transformed, then $E_i$ is the next process increment to be dispatched. This value is maintained at runtime. |
| $V_i(t)$ | For incremental processes, the tiem at which the last dispatch of $r_i$ occurred. This applies to the transformed pieces, not the entire process. For design-to-time processes, $V_i$ is the time at which the current instance of $r_i$ was dispatched. |
| $m_i(t)$ | The index at which the next start of the entire process of $r_i$ will begin. $m_i = t_i \lceil E_i / t_i \rceil$. Note that for $t_i = 1$, $m_i = E_i$. |
| $S_i(t)$ | The level $i$ slack available in $[0, t]$ which is the amount of time a level $i$ process can execute before having to suspend itself without causing any other processes to miss their deadlines. |
| $(I, P, M)$ | An entry in a process increment queue. $I$ is the slack level. $P$ is the amount time requested to process the increment. $M$ is the amount of time by which the requesting increment could be delayed, and still not miss deadline. |

Table 2

FIG. 1

TIMELINE WITH SLACK RECLAMATION
FROM UNUSED COMPUTE TIMES

WORST CASE TIMELINE  U = 0.86 = BREAKDOWN UTILIZATION

RECLAIMED SLACK FROM tau (1)
SUPPOSE C(1,1) = 1  C(1,2) = 2.5 AND C(1,3) = 3   U=0,68

| tau | Ci | Ti |
|---|---|---|
| tau (1) | 4 | 10 |
| tau (2) | 7 | 15 |

Incremental Acceptance Test Algorithm

Algorithm Incremental_Acceptance_Test ($k$: in slack level;
  $P_k$: in compute time) return boolean;
  -- This algorithm either accepts or rejects $J_k$,
  -- scheduled at slack level $k$, with processing
  -- time requirement $P_k$.

Available_Slack ($k$, $a$, $Q_k$);
  if $Q_k < P_k$ then return FALSE; end if:                                     -- reject $J_k$
  if $M_k := Q_k - P_k$;
  -- check that all higher priority jobs will
  -- not cause $J_k$ to miss its deadline.
  for all tuples $\{(l, P, M)\}$ such that $l \le k$ loop
      $M_k(a) := M_k(a) - P$;
  end loop;
  if $M_k < 0$ then return FALSE;                                               -- reject $J_k$
       else $J_k$'s tuple $= (k, P_k M_k)$;
  end if;
  -- check that all lower priority jobs will
  -- not miss their deadlines if $J_k$ is accepted.
  for all tuples $\{(l, P, M)\}$ such that $l > k$ loop
      if $M - P_k < 0$ then return FALSE; end if;                               -- reject $J_k$
  end loop;
  -- accept Jk after updating the lower priority tuples
  for all tuples $\{(l, P, M)\}$ such that $\{(l, P, M)\}$; loop
      $M := M - P_k$;
  end loop;
  Add $(k, P_k, M_k)$ to $\{(l, P, M)\}$;
  return TRUE;                                                                  -- accept $J_k$

FIG. 4

Design-to-Time Acceptance Test Algorithm

Algorithm Design_to_Time_Acceptance_Test
(k: in slack level) return time;

-- This algorithm determines how much extra slack
-- is available for design-to-time process $r_k$.
-- Note that if no additional slack is available, the
-- baseline computer time amount will be used.

Available Slack $(k, a, Q_k)$;
if $Q_k < 0$ then return 0; end if;
$M_k := Q_k$;
    -- check that all higher priority jobs will not cause
    -- $J_k$ to miss its deadline.
for all tuples $\{(l, P, M)\}$ such that $l \leq k$ loop
    $M_k(a) := M_k(a) - P$;
end loop;
if MK < 0 then return 0, end if:
-- check that all lower priority jobs will not miss
-- their deadlines if Mk slack is allocated,
-- or decrease the allocation amount.
for all tuples $\{(l, P, M)\}$ such that $l \leq k$ loop
    if $Mk > M$ then $Mk := M$; end if;
end loop;
if $M_k > 0$ then $P_k := M_k$; $M_k := 0$; end if;
-- accept $r_k$ with additional $P_k$ after
-- updating the lower priority tuples
for all tuples $\{(l, P, M)\}$ such that $l \leq k$ loop
    $M: M - P_k$;
end loop;
Add $(k, P_k, M_k)$ to $\{(l, P, M)\}$;
return $P_k$;

FIG. 5

Available Level $k$ Slack in $\left[a, F_{k,m_k}\right]$

Algorithm Available_Slack (k: in slack_level;
   a: in time; Q: out slack)
-- This algorithm computes the level k available slack in
-- the interval $\left[a, F_{k,m_k}\right]$. Note that if $t_k = 1$,
-- algorithm Adjust_Slack_Values is never called.

-- begin initialize
begin
  $t_a := a;\ Q := 0;\ \beta := F_{k,m_k};$
  for $i := 1, ..., n$ loop
    $\widetilde{E}_i := E_i;\ \widetilde{C}_i := C_i - C_i(a);\ \widetilde{V}_i := V_i;$
    $\widetilde{S}_i := A_{i,E_i} - (A_i + I_i);$
  end loop;
  $t_\beta = a;$
-- end initialize -- begin outer loop of code which is $O(t_k)$
-- call to Adjust_Slack_Values is made $t_k - 1$ times.
while $t_\beta < \beta$ loop
  $\widetilde{S}^* := \min_{k \leq i \leq n} \widetilde{S}_i;$
  $L := \max\{l | k \leq l \leq n \text{ and } S_l = S^*\};$
  $t_\beta := F_{L,E_L};$
  $Q := Q + \min\{S^*, t_\beta - t_a\};$
  if $t_\beta < \beta$ then
    Adjust_Slack_Values $(t_\beta, \widetilde{S}, \widetilde{S}^*, \widetilde{C}, kE, \widetilde{V});$
    $t_a := t_\beta;$
  end if;
end while;
-- end outer loop of code

FIG. 6

Adjust Available Slack Values

Algorithm Adjust_Slack-Values ($\beta$: in time;
$\quad$ $S$: in out vector of time; $\widetilde{S}*$ : in time;
$\quad$ $C$: in out vector of time; $k$: in slack level;
$\quad$ $E$: in out vector of indices;
$\quad$ $V$: in out vector of dispatch times);

-- Adjust for increment processing to occur by
-- subtracting off $S^*$.
for $j$: $= k, ..., n$ loop
$$\widetilde{S}_j := \widetilde{S}_j - \widetilde{S}*;$$
end loop;
-- the $i$ loop is $O(n)$
for $i$: $= k, ..., n$ loop
$$n_i := \left\lceil \frac{\beta - \widetilde{V}_i}{T_i} \right\rceil;$$

-- Adjust for periodic processing to occur by subtracting
-- off $C_i$'s. This $i$ - $j$ loop is $O(n(n-1))$.
for $j$: $= k, ..., i - 1$ loop
$$\widetilde{S}_j := \widetilde{S}_j - n_i \cdot C_i;$$
end loop;
-- Increment slack jump heights by adding $s(F_{i,j})$'s.
-- this $i$ - $j$ loop is $O(n \left\lceil \frac{T_n}{T_1} \right\rceil)$ for $j := \widetilde{E}_i, ..., \widetilde{E}_i + n_i$ loop
$$\widetilde{S}_j := \widetilde{S}_j + s(F_{i,j});$$
end loop;
$$\widetilde{E}_i := \widetilde{E}_i + n_i;$$
$$V_i := \left\lfloor \frac{\beta}{T_i} \right\rfloor \cdot T_i;$$
end loop;

FIG. 7

SLACK SCHEDULING FOR IMPROVED RESPONSE TIMES OF PERIOD TRANSFORMED PROCESSES

BACKGROUND OF THE INVENTION

This invention is directed generally to criticality support for aperiodics when using slack scheduling. This invention is also directed towards slack scheduling for improved response times of period transformed processes. Further, this invention is directed towards slack scheduling applied to incremental periodic processes.

Existing methods for scheduling critical real-time periodic processes treat the execution time as a fixed, worst-case and known quantity that cannot change at run-time. In many optimizing control applications, processes can be written so they consume a fixed minimum execution time, followed by one or more optional execution increments of some size. The minimum execution time produces an acceptable but suboptimal solution that can be incrementally improved if additional execution time can be made available at run-time. Functions with this property are called incrementally precise functions or incremental processes. Aerospace applications that may be candidate algorithms are "optimal problems", such as optimal control, optimal guidance, or optimal orbit transfer, which have solution techniques that are iterative. Other candidates might be fault detection, weapon deployment algorithms and diagnostic session interactions.

Alternatively, a process may be such that its execution time is parameterizable in the sense that a "bigger" problem can be solved when more time is available, and the problem "size" actually solved is determined by the amount of time available at run-time. This type of scheduling is known as design-to-time. As an example, the precision of a guidance calculation might be determined by the "size" of the grid/array modeling the terrain used to compute the trajectory. If a guidance algorithm with this property were modeled as a design-to-time application, the largest size array that would fit the available compute time would be selected.

SUMMARY OF THE INVENTION

A method for increasing the potential use of processor time and increasing response time. The process comprises the steps of defining process criticalities. Then transforming a periodic task set, and finally allocating available slack to transformed period processes.

BRIEF DESCRIPTION OF THE DRAWING

Table 1 is a Periodic Process Specification.

Table 2 is the Slack Variables Definitions.

DESCRIPTION OF THE PREFERRED EMBODIMENT

All periodic tasks are assumed to be scheduled using Rate Monotonic Scheduling (RMS) where incremental and design-to-time processes have as their statically specified worst case compute time, the minimum amount of time to produce an acceptable but suboptimal result. The algorithms used to answer the question "how much time is available?" are based on a slack stealer with practical extensions for real world implementations. Slack stealing is well known in the art and is taught in two articles by John P. Lehoczky and Sandra Ramos-Thuel entitled "An optimal Algorithm for Scheduling Soft-Aperiodic Tasks in a Fixed-Priority Preemptive Systems", Real-Time Systems Symposium, IEEE Proceedings, December 1992, and in the article entitled, "Algorithms for Scheduling Hard Aperiodic Tasks in Fixed-Priority Systems using Slack Stealing", Real Time Systems Symposium, IEEE Proceedings, December 1986. Real world solutions found in an article by the inventor entitled, "Scheduling Slack in MetaH", $17^{th}$ IEEE Real-Time Systems Symposium, Work in Progress Proceedings, December 1996. Rate Monotonic Scheduling is further described in an article by C. L. Lui and J. W. Leyland, "Scheduling Algorithms for Multiprogramming in a Hard Real-Time Environment", Journal of the ACM20(1), January 1973, pp. 46–61. All of the above named references are hereby incorporated by reference. The run-time algorithm can be simplified for incremental processes because deadlines are predefined (rather than relative to an arbitrary aperiodic arrival time), and the search window used during slack computations can be decreased for untransformed incremental and design-to-time processes.

We will now very briefly describe the notation used to specify a periodic task set. The same notation is used in subsequent algorithms and analysis throughout the application, and is largely consistent with the notation used in previously noted references. As this information is well known in the art the reader is urged to consult these references when more comprehensive definitions are needed. Periodic process attribute specification is summarized in Table 1.

Every periodic process stream $\tau_i$ has a fixed period $T_i$ which is the time between dispatches, a worst case compute time specification $C_i$, and a deadline $D_i$ which is specified relative to its arrival time. Task phasings are assumed to be zero and $D_i=T_i$. Both non-zero task phasings and preperiod deadlines can be supported. The $j^{th}$ dispatch of $\tau_i$ is denoted as $\tau_{ij}$ which has dispatch time $(j-1)T_i$ and deadline $D_{ij}=jT_i$. Lastly, a periodic process stream $\tau_i$ has a user-defined criticality, denoted by $r_i$ which defines its relative ranking in the entire set of processes. When using RMS, there is an implicit process priority defined by the rate structure with the highest priority assigned to the highest rate process. When the process priority and user-defined process criticalities do not have the same ordering, the period transformation method can be applied, originally defined in an article by Lui Sha, John Lehoczky, and Ragunathan Rajkumar, "Solutions for some Practical Problems in Prioritized Preemptive Scheduling", Real-Time Systems Symposium, IEEE Proceedings, December 1986, hereby incorporated by reference.

Incremental processes require additional specification. If $\tau_i$ is an incremental process stream, then each instance of $\tau_i$ consists of a mandatory baseline component and $n_i$ optional increments. The worst case execution time of the baseline component is denoted by $C_{b,i}$, and the worst case execution time of the $j^{th}$ optional component is denoted by $C_{inc,j,i}$ where $1 \leq j \leq n_i$. For simplicity, we assume that $C_{inc,j,i}=C_{inc,k,i}$ for $1 \leq j$, $k \leq n_i$, so we denote each increment's worst case execution time by $C_{inc,i}$. It is merely notation to extend it to the more general case. Note that an ordinary periodic process can be represented as an incremental process with no optional components. The deadlines for every increment are the same as the deadline for the baseline component.

Design-to-time processes also require additional specification involving a parameterization. If $\tau_i$ is a design-to-time process with $n_i$ different "sizes", define $C_i(k)$ to be the worst case compute time for $\tau_i$ when executing the problem with size ranking k, where $C_i(1)<C_i(2)<\ldots<C_i(n_i)$. The compute time used in off-line feasibility test is $C_i(1)$, the minimum time guaranteed to produce an acceptable but suboptimal answer. $C_i(1)$ is also denoted by $C_{b,i}$ for unification of notation.

The following I/O design requirements have been made for the processes as well:

Process inputs for $\tau_{ij}$ are read at $\tau_{ij}$'s dispatch time $(j-1)T_i$. Outputs from $\tau_{ij}$ are available at time $D_{ij}$. This applies to ordinary periodic, incremental, and design-to-time processes.

Incremental processes merit further attention. Only the baseline component of an incremental process has inputs which are read when the baseline is dispatched. The outputs of incremental components become available to other processes at the end of the incremental process' period. Thus, only the last incremental component (or baseline component if no increment is ever executed) has an output that can be read by other processes. Supporting inputs and outputs at arbitrary times causes complexity in the underlying operating system, and with slack scheduling the times of the I/O might become non-deterministic if not established at a fixed time. This is often done anyway to control jitter.

Supporting Process Criticalities

In MetaH, both periodic and aperiodic processes can be assigned a static process criticality which indicates the level of importance the system designer attributes to the process. In MetaH, assigning a process p a criticality j means that all timing faults in processes with criticality less than j (criticalities are numerically increasing) will not affect the amount of time allocated to p. In other words, timing faults in processes of lower criticality will not impact processes with higher criticality. During periods of transient overload, the criticality assignment is used to determine which tasks receive processor priority.

To implement support for process criticalities, the periodic process task set is first period transformed so the ranking of the transformed rate corresponds to the ranking of the process criticality. Here is a simple example to illustrate. Let the periodic task set be $T_1, T_2$, and $T_3$ with periods $T_1=102, T_2=202$, and $T_3=300$, and criticalities 1, 2 and 4 respectively. The transformed task set has $T'_3=100, T'_2=101$ and $T'_1=102$. Next the aperiodic processes are assigned a "slack-level" equal to the periodic process priority with the highest criticality not greater than the criticality of the aperiodic process. Continuing with our example, let $\alpha$ be an aperiodic process stream with criticality 3. Then $T_1, T_2$, and $T_3$ are assigned slack-level (or equivalently periodic process priority) 3, 2, and 1, respectively. $\alpha$ is assigned slack-level 2 since $T_2$ has priority 2 and it is the periodic process with the highest criticality less than that of $\alpha$. Priorities can be assigned within a slack-level when there are multiple aperiodic streams whose criticalities map to the same slack-level. Details of the results are seen in Table A below.

TABLE A

|  | $T_i$ | $r_i$ | $T'_i$ | sl | (sl, r') |
|---|---|---|---|---|---|
| $\tau_1$ | 102 | 5 | 102 | 3 | (3, 1) |
| $\tau_2$ | 202 | 4 | 101 | 2 | (2, 3) |
| $\tau_3$ | 300 | 1 | 100 | 1 | (1, 1) |
| $\alpha_1$ |  | 2 |  | 2 | (2, 1) |
| $\alpha_2$ |  | 3 |  | 2 | (2, 2) |

To support process criticalities (among both periodic and aperiodic processes), process time-outs must be enforced at run-time. A periodic process is allowed to overrun its deadline, but only by repeatedly requesting execution timeslices. For an untransformed periodic process, this may result in a missed dispatched (which the application may tolerate). Alternatively, the missed deadline can be treated as a failure where the process is restarted. For a transformed periodic process, only the last timeslice can result in determination of an incomplete process execution. Again, subsequent timeslices can be requested or a failure to miss a deadline might be noted. Aperiodic processes are similar to transformed periodic processes in that their execution time may span several slack intervals. If the aperiodic process has not completed when the slack has been consumed, it times-out and is suspended to later inquire whether more slack has become available.

Note that a higher criticality incoming aperiodic will preempt an executing aperiodic, slack updates will be made, and slack will be reallocated to the higher criticality aperiodic. Also observe that a requesting aperiodic with slack-level i will only be allocated the slack available in the interval beginning at the time of request and ending at the completion time of the periodic with priority not greater than i that would result in a missed deadline if the available slack were increased. Using time-outs in this way guarantees that an execution overrun in a process with criticality j will not cause any processes with criticality greater than j to miss their deadlines.

Slack Stealing and Incremental RMS

Initially we will look intuitively at how different sources of slack can be scheduled for incremental and design-to-time processes and how incremental and design-to-time period transformed processes require additional care. Familiarity with the original slack stealing algorithm is requisite for a full understanding of our modifications. The more commonly used notation is summarized in Table 2.

While reading the next several sections, it may be helpful to keep in mind the steps necessary to apply slack stealing to an untransformed incremental process. First, the amount of slack available from the start of a hyperperiod to the deadline of each task dispatched throughout the hyperperiod is computed offline and stored in a table that is used at run-time. At run-time a four step procedure for the run-time calculation of available slack is used in our slack scheduling algorithm for untransformed incremental periodic processes. First, a table look-up gives the amount of slack time available from the start of the current hyperperiod to the completion of the next periodic process (at the process' priority level). Next, this slack value is adjusted by subtracting off all incremental and extra design-to-time processing and all idle time (of the appropriate priority level) that has occurred between the beginning of the hyperperiod and the time of the request. Third, the minimum of all slack values computed with equal or lower priority is taken to ensure that no lower priority periodic process will miss its deadline. If there is sufficient slack to complete an increment prior to its deadline, it is accepted and the available slack values are adjusted to reflect the slack commitment, otherwise it is rejected.

Slack allocation for untransformed design-to-time processes differs from slack allocation for untransformed incremental processes in only minor ways which are discussed later. When an incremental or design-to-time process has been period transformed, determining the slack availability requires simulating the timeline into the future which can greatly increase the time it takes to determine slack availability.

Figure 1:
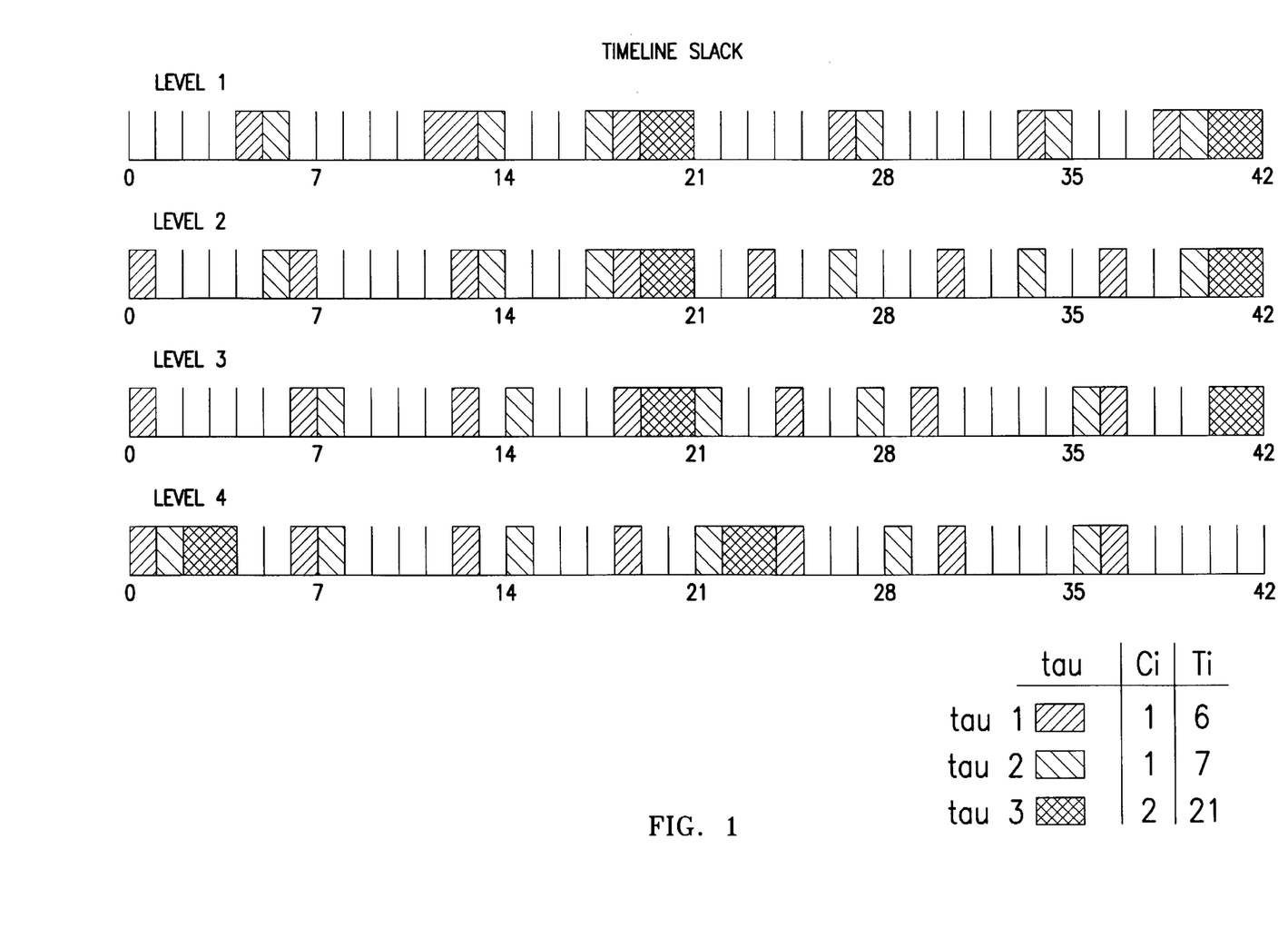
FIG. 1 illustrates Timeline for Slack.

The first source of slack we call timeline slack, which is static in that the periodic task set and their properties define it completely. The slack inherent in the timeline can be intuitively understood through an example. FIG. 1 illustrates slack available at four different slack levels. In FIG. 1 there are three periodic processes $\tau_1$, $\tau_2$ and $\tau_3$ with periods $T_1=6$, $T_2=7$, $T_3=21$ and (worst case) compute times $C_1=1, C_2=1$, $C_3=2$, respectively. The periodic task set properties are summarized in Table 3. Slack allocated at level i means that the executions of dispatches of $\tau_i$, $\tau_{i+1}$, ..., $\tau_n$ will be delayed as long as possible without causing any of them to miss their deadlines, allowing the process requesting slack to execute. Slack at level n+1 is equivalent to background processing.

The computation of timeline slack is as follows. For each interval $[0, D_{i,j}]$, the amount of level i−1 slack, $L_{i,j}$ is computed which is the amount of time not spent processing $\tau_1, \tau_2, \ldots, \tau_{i-1}$. The amount of level i slack in $[0, D_{i,j}]$, is then $L_{i,j}$−j$C_i$ which is denoted by $A_{i,j}$. The $A_{i,j}$ values are computed off-line and stored in a matrix which is loaded as a part of the run-time executive. For the periodic task set with baseline compute time values described in Table 3, the $(A_{i,j})$ matrix for the timeline slack example are shown in Table 4. The $(A_{i,j})$ matrix is also referred to as the accumulated slack matrix.

We also compute the latest time $\tau_{i,j}$ will complete in the absence of all lower priority processes, which is denoted by $F_{i,j}$. It turns out that if $D_{i,j}$ is not in a level i−1 busy interval, then $F_{1,j}=D_{i,j}$. (Otherwise $F_{i,j}$ equals the start of the level i−1 busy interval containing $D_{i,j}$.) The $F_{i,j}$ values are computed off-line and stored in a matrix which is loaded as a part of the run-time executive. The $(F_{i,j})$ matrix for the timeline slack example are shown in Table 5. The $F_{i,j}$ matrix is also referred to as the latest completion time matrix.

Figure 2:
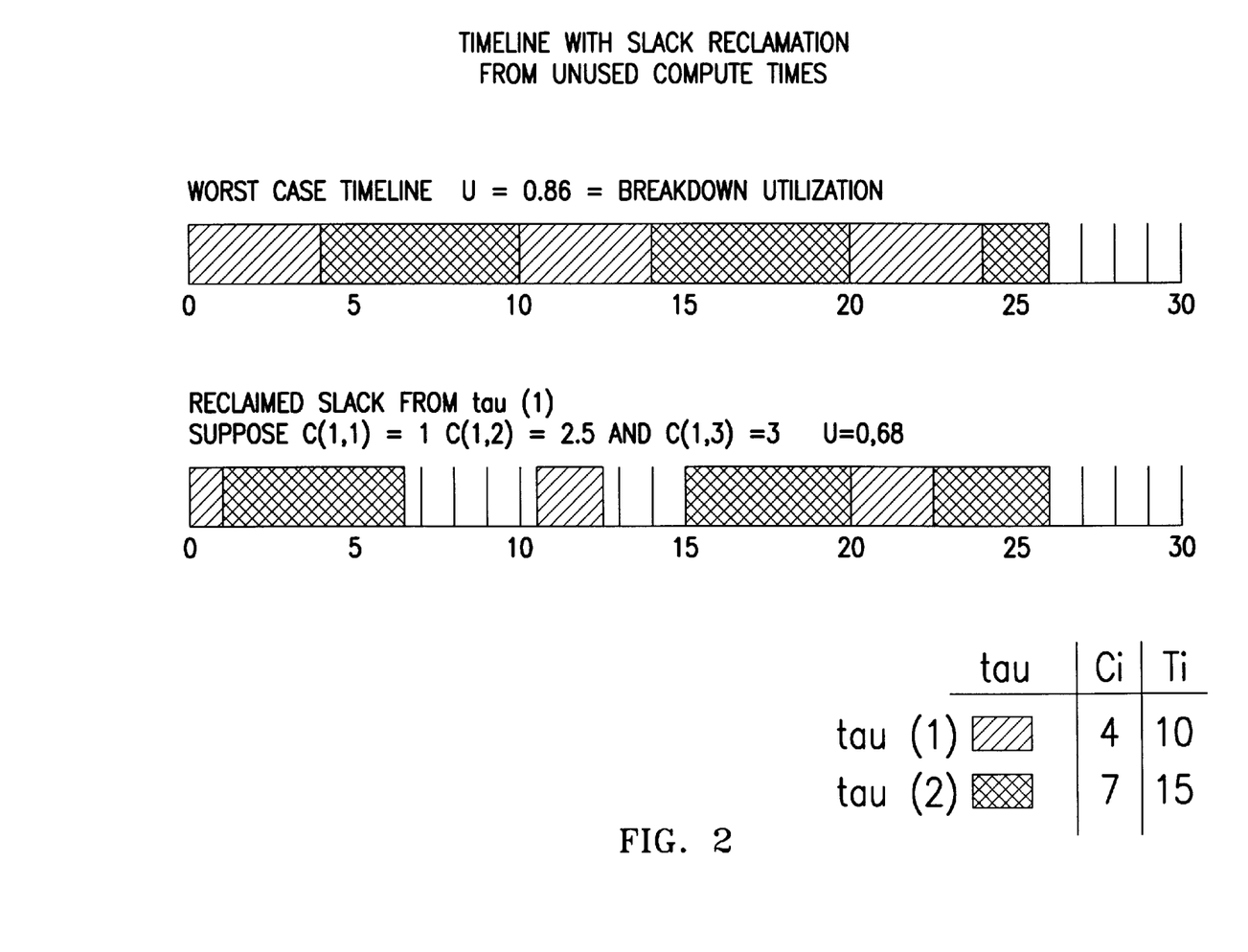
FIG. 2 illustrates a Timeline with Slack Reclamation from Unused Compute Times.

The second source of slack is reclaimed slack, which is the reclamation of unused worst case execution time. Reclaimed slack is a dynamic quantity that must be computed at runtime. When using slack scheduling, slack can be reclaimed from processes that complete in less than their worst case execution times. FIG. 2 illustrates slack reclamation. The top of FIG. 2 is the timeline when both $\tau_1$, and $\tau_2$ always consume their worst case execution times. The breakdown utilization is unity in this example, thus no greater worst case baseline compute times could be supported while achieving a feasible schedule. The bottom timeline shows $\tau_1$ using less than its worst case execution time. The first dispatch of $\tau_2$ completes at time 8 rather than at time 15, as in the former case. Classical RMS automatically reclaims unused execution time, hence the bottom of FIG. 2 would be observed without the use of slack stealing. However, it does not keep track of how much slack has been reclaimed and so can not guarantee how much it can allocate to increments. At design time it is desirable to approximate the amount of dynamic slack that will be reclaimed at run-time to get an estimate of how much actual bandwidth will be available for either non-critical tasks or task increments.

The slack stealer includes both timeline and reclaimed slack when calculating the amount of available time for execution of process increments or additional time for design-to-time processes. The basic difference between the incremental and design-to-time process models is the time of inquiry for the amount of available slack. In the incremental process model, the process requests slack after it has executed its baseline increment, and a request is made for each increment. In the design-to-time model, the process requests slack prior to execution, then adds the basic compute time to the slack available. Since the slack stealer makes use of reclaimed slack, it is preferable to ask for slack as late as possible. In other words, the delayed requests for incremental processing allows more time for reclaiming slack, perhaps even from unused worst case execution time of the baseline component for the requesting process.

Slack Scheduling for Improved Response Times of Period Transformed Processes

When user-defined process criticalities result in processes being period transformed, some number of (baseline) processes will be executed in time slices. The period transformation problem can be roughly formulated as follows. Given $r_1 \leq r_2 \leq \ldots \leq r_n$ (the smaller the ranking, the higher the priority), and $T_k \leq T_j$ for some k>j then find $t_1, t_2, \ldots, t_n$ such that $$\frac{T_{r1}}{t_{r1}} \leq \frac{T_{r2}}{t_{r2}} \leq \ldots \leq \frac{T_{rn}}{t_{rn}}.$$

In other words, find a set of transform factors such that when each period is divided by its transform factor, the priority structure defined implicitly by RMS corresponds to the user-defined criticality rankings. More details on the method of period transformation can be found in the Lui et. al article.

The result of transforming the period of a process $\tau_i$ is that the execution of the baseline is in pieces of duration $C'_{b,i}=$ $$C'_{b,i} = \frac{C_{b,i}}{t_i},$$

each piece corresponding to a time slice. The time slices are dispatched periodically at the transformed rate, $T'_i=$ $$T'_i = \frac{T_i}{t_i},.$$

Slack stealing can be used to increase the response time of the period transformed baseline component simply by allocating the worst case time slice compute time plus all slack available at the level of process to each transformed baseline piece.

Figure 3:
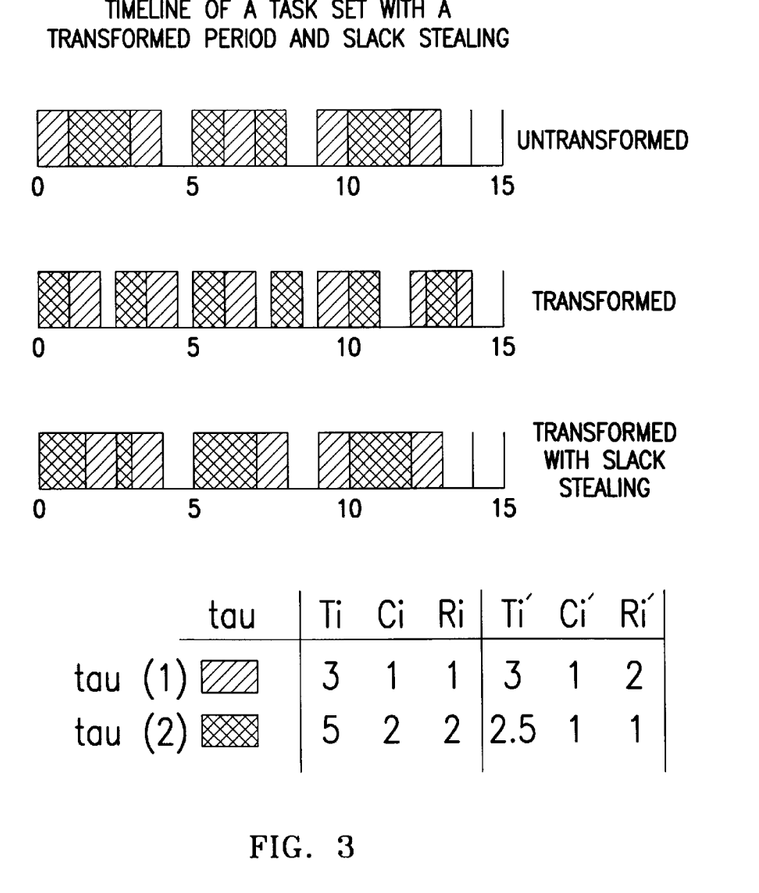
FIG. 3 illustrates a Timeline of a Task Set with Slack Stealing applied to a Period Transformed Task.

FIG. 3 illustrates the timeline when a process has been period transformed. The top portion of FIG. 3 shows the timeline when their rankings are determined by their rate structure (i.e. $r_1=1$, and $r_2=2$). The middle figure shows the timeline when the rate structures are reversed ($r_1=2$, and $r_2=1$). No slack allocations are being made to the transformed pieces of $\tau_2$ in FIG. 3. Each baseline time slice is allocated a maximum execution time equal to the worst case time slice execution time.

For period transformed baseline components of incremental processes, we recommend that each baseline time slice be allocated all available slack at the priority of the time slice plus the worst case time slice execution time. The effect of this policy is to speed up the execution of the baseline component so that subsequent time slices are available for the optional increments. This policy is illustrated at the bottom of FIG. 3. If $\tau_k$ is a transformed incremental process with transform factor $t_k$ and period $T_k$ (note this is not the transformed period), then the first request for an increment can not occur until the baseline component has completed executing which is at least $$\frac{t_k - 1}{t_k} \cdot T_k$$

into the period. At a minimum the increment request will occur at the earliest (when $t_k=2$) half way into the period.

We conjecture that there may also be less overhead spent in context swaps since execution times of the baseline time slices will be no shorter every time the process is at the head of the queue. Beyond the possibility of reduced context swap times, there doesn't appear to be any benefit in assigning available slack to either the simple periodic processes (without increments) or transformed design-to-time time slices. In fact, executing only the allotted time slice may leave slack available for processes with increments and shorter deadlines.

Run-Time Algorithm

This section contains the run-time algorithms used for allocating slack to increments and/or design-to-time processes. The algorithms presented have been derived from those in Ramos—Thuel et al article "Algorithm for Scheduling Hard Aperiodic Tasks in Fixed-Priority System using Slack Stealing", with both simplifications and extensions needed to support practical applications efficiently at run-time. As one of ordinary skill in the art would know how to derive the algorithms, this section focuses only on the detailed modifications, sometimes only alluding to portions of the original algorithm when there are no modifications. The reader is referred to the Ramos—Thuel and Lehoczky articles for supplemental details and definitions.

Figure 4:
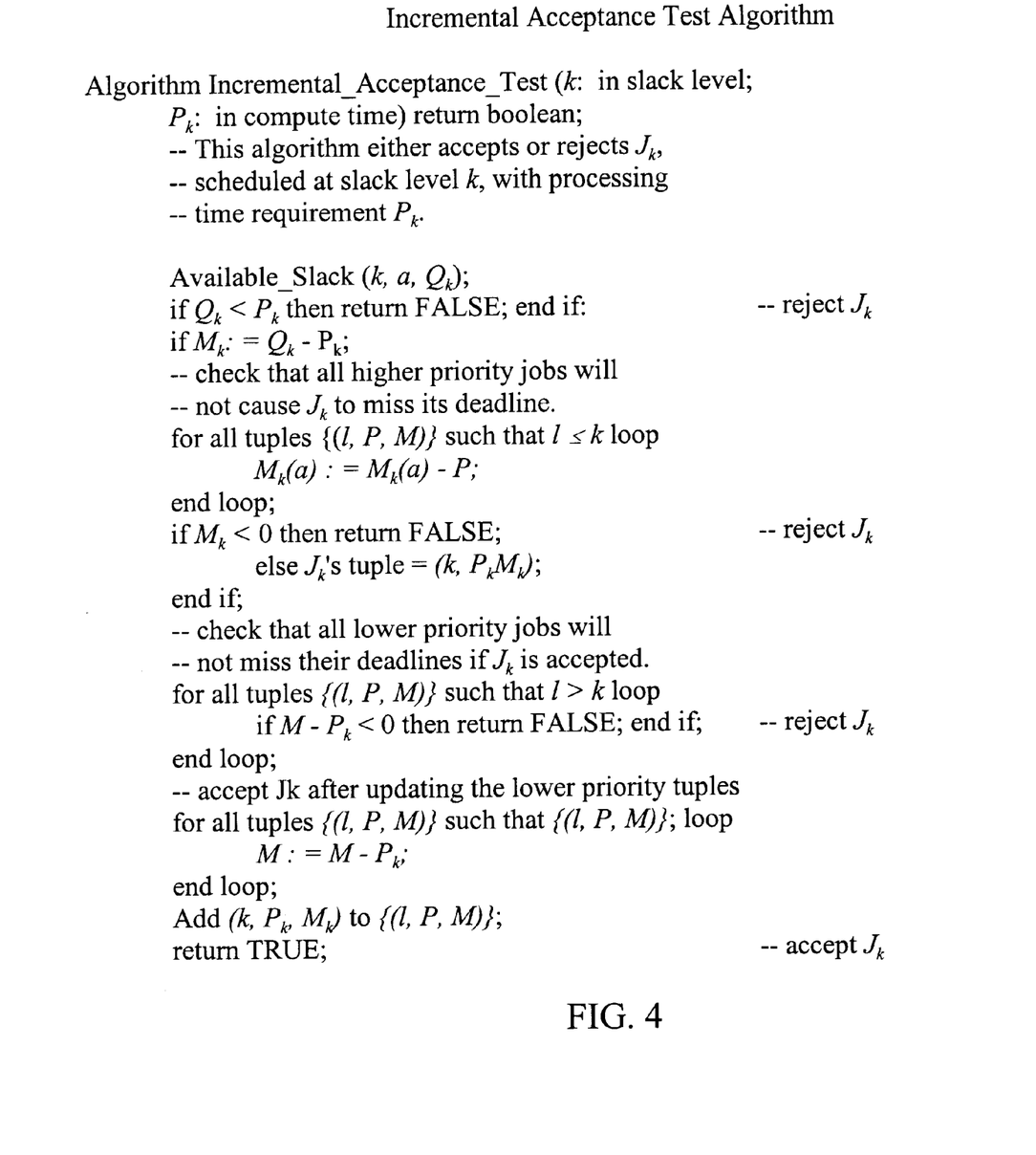
FIG. 4 is the Incremental Acceptance Test Algorithm.
Figure 5:
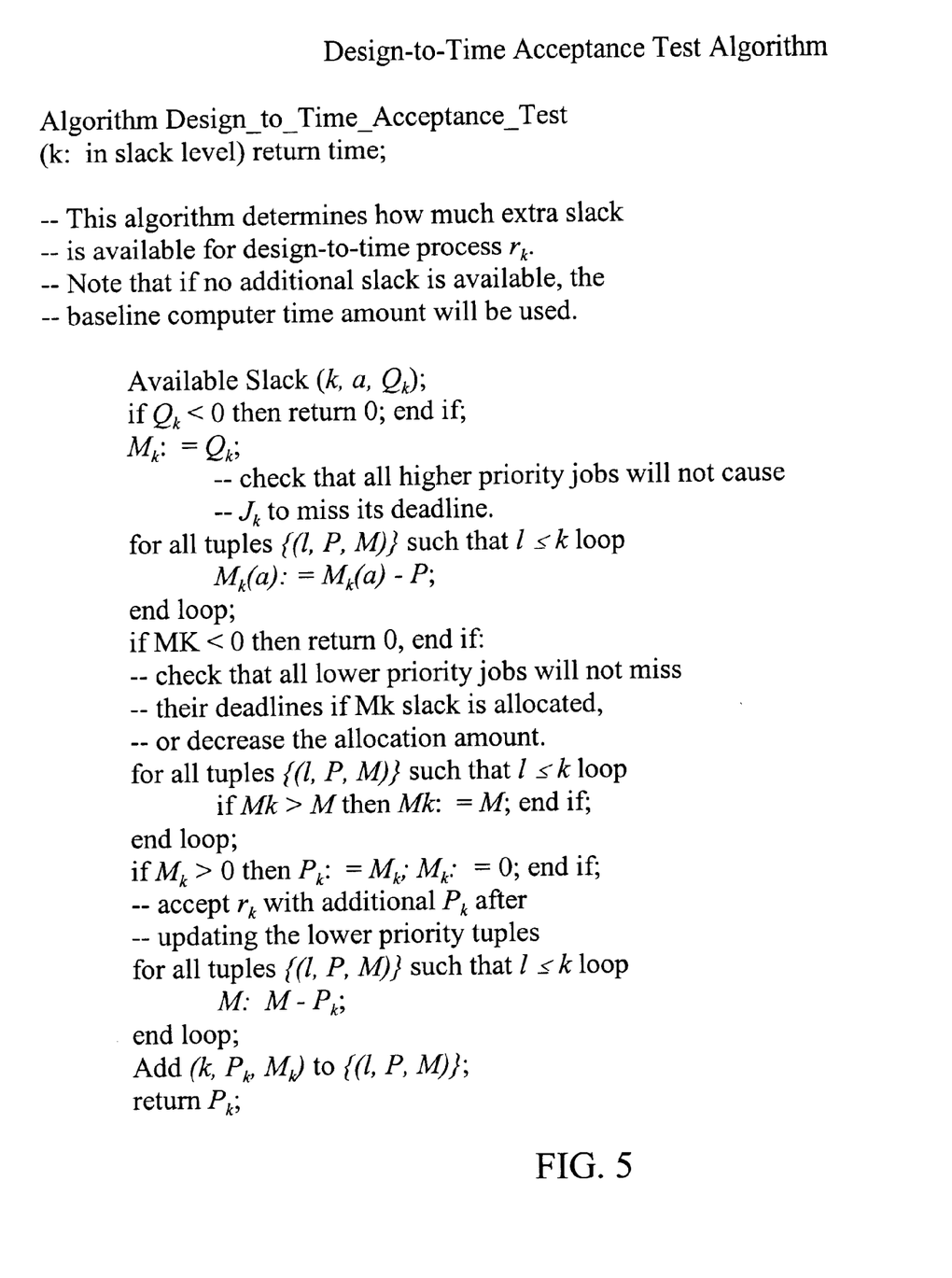
FIG. 5 is the Design-To-Time Acceptance Test Algorithm.

Our algorithms are presented in code-like pseudo code so the computational complexity is more readily studied. When a design-to-time process is to be scheduled, a call to Design_to_Time_Acceptance_Test (FIG. 5) is made. The amount of slack returned is used to determine the size of the problem that can be solved. Similarly, when a process wishes to execute an increment, Incremental_Acceptance_Test (FIG. 4) is called. Both acceptance test algorithms must be executed at a priority higher than any incremental or design-to-time process. The remainder of the discussion focuses only on incremental processes.

In addition to the RMS ready queue, there is a process increment queue for which entries are denoted by (I, P, M), where/is the slack level (or priority) at which the process has requested slack, P is the amount of slack granted in addition to the baseline component, and M is the amount of time for which this process increment could be delayed and still not miss its deadline nor cause any other processes (of lower priority) to miss their deadlines. The collection of all scheduled process increments is denoted by {(I, P, M)} which has as members those process increments that have been accepted for execution. Note that in the case of incremental periodic processes, there will be at most one increment per slack level at any time in the incremental process queue. We have also assumed that existing members in the queue are scheduled on a strictly priority basis.

Algorithm Incremental_Acceptance_Test (FIG. 4) first calls algorithm Available_Slack which determines how much slack is available at the time of the call to the deadline of the increment. If there is less slack available than the increment is requesting, it is rejected. Otherwise, the acceptance test must assure that admitting the requesting increment will not cause previously accepted increments to miss their deadlines.

Figure 6:
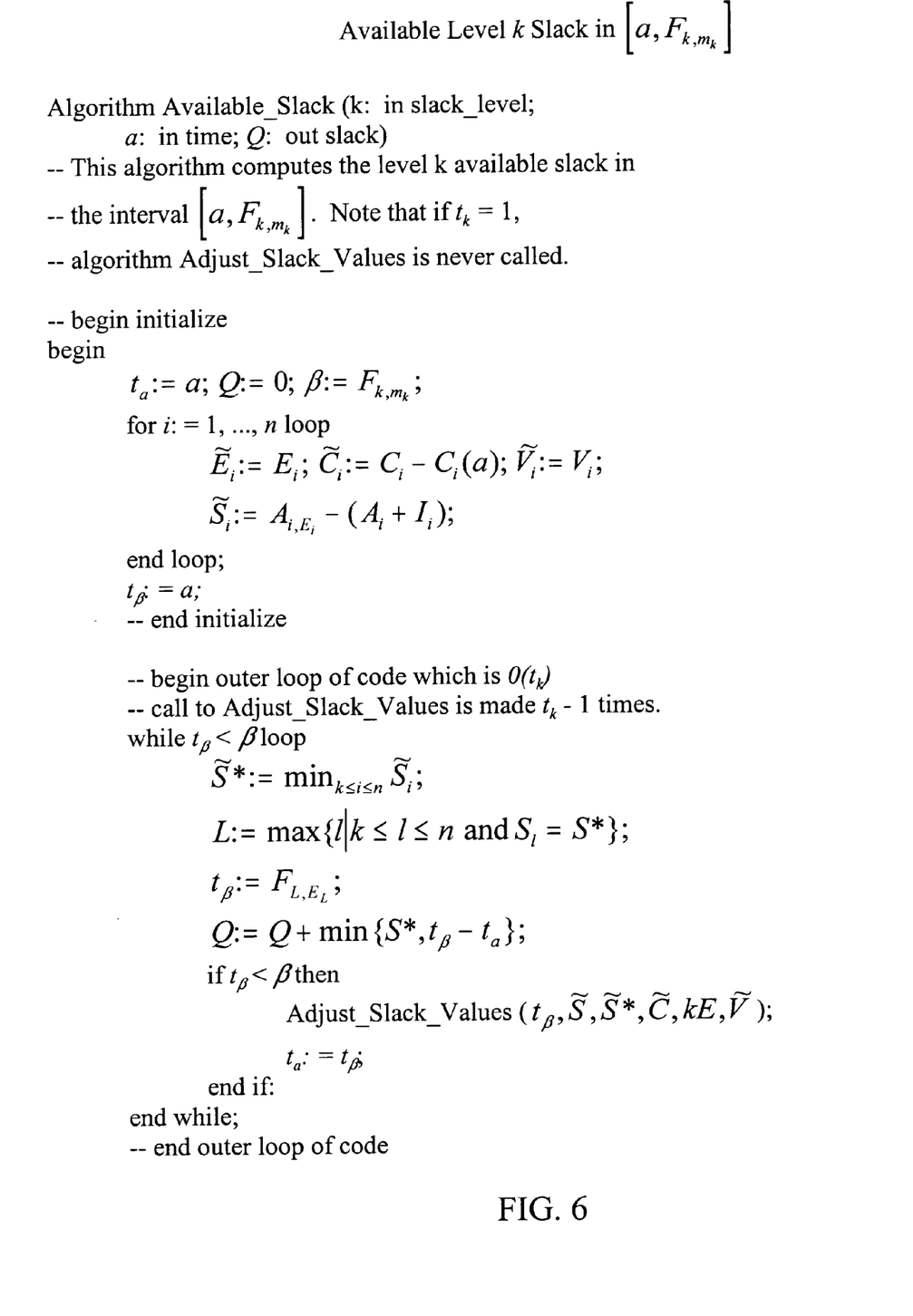
FIG. 6 is the Available Level k Slack Algorithm.

Algorithm Available_Slack (FIG. 6) answers the question "How much level k slack is available in the interval [t, $F_{k,m_k}$]?". Note that if $\tau_k$ has not been transformed, then $m_k=E_k$ and the deadline is at the next dispatch of $\tau_k$. However, if $\tau_k$ has been transformed then the next dispatch of a time slice of $\tau_k$ s not necessarily the next dispatch of the entire process of $\tau_k$. In other words, the dispatch time of a process is the time at which the process begins execution, not a resumption that resulted from time slicing. When $\tau_k$ is not transformed, $t_\beta=\beta$ and procedure Adjust_Slack_Values is never called. In this case, the performance of Available_Slack is suitable for most real-time applications.

Figure 7:
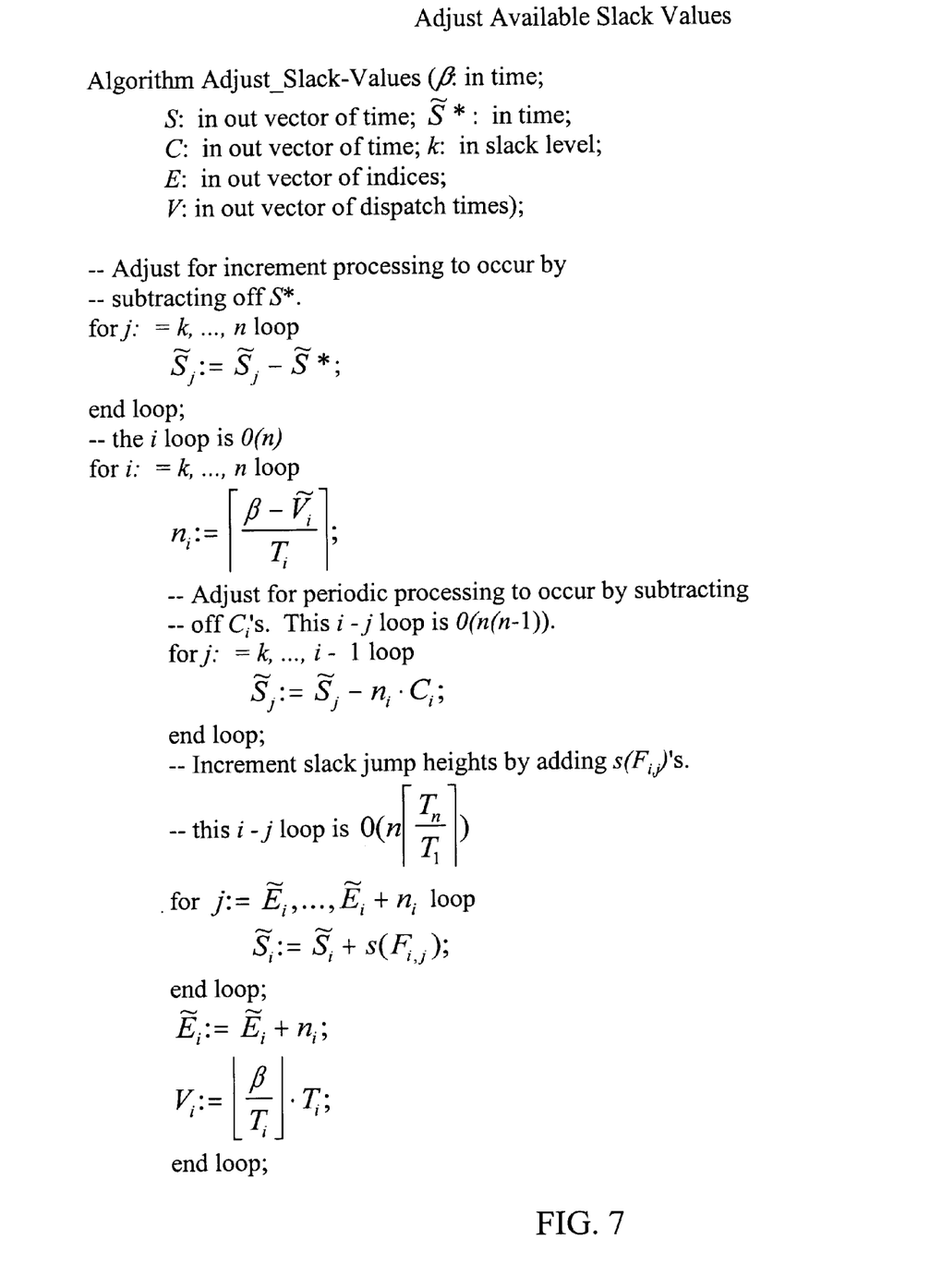
FIG. 7 is the Adjust Available Slack Values Algorithm.

Algorithm Adjust_Slack_Values (FIG. 7) conceptually traverses the timeline subtracting off the execution times of higher priority processes, and adding up the slack increments for an equal slack level. The outer loop in Available_Slack is iterating between level k busy/idle intervals.

Computational Complexity

The comments in FIGS. 4–7 can be used to get a rough order of computational complexity. The acceptance test algorithms (both incremental and design-to-time) traverse a queue of length at most n, so their computational complexity is O(n)plus the computational complexity of Available_Slack. The complexity of Available_Slack is $O(n)+(t_k-1)$ max(O(n(n-1)), $$O(n) + (t_k - 1)\max\left(O(n(n-1)), O\left(n\left\lceil\frac{T_n}{T_1}\right\rceil\right)\right),$$

where max(O(n(n-1)), $$\left(O(n(n-1)), O\left(n\left\lceil\frac{T_n}{T_1}\right\rceil\right)\right)$$

is the computational complexity of Adjust_Slack_Values.

To derive approximate (order of magnitude) measures of constants for the complexity order terms, we rewrote algorithms Incremental_Acceptance_Test, Available_Slack, and Adjust_Slack_Values in a pseudo assembly language and counted the number of instructions of a certain type. We have made several assumptions about our pseudo assembly code and its pseudo processor:

Our pseudo assembly language and processor have 16 registers.

Register to register operations are relatively fast (e.g. two clock cycles). Integer adds, compares, and local jumps are considered as register to register ops. It turns out that this term doesn't dominate, so three or four clock cycle ops won't chance things that much.

Memory accesses are assumed to be relatively (but not horribly) slow (e.g. ten clock cycles). This term does tend to dominate. For heavily pipelined processors, ten clock cycles might be a high estimate.

Calls and returns are assumed to take 12 memory accesses (for register saves—only the used registers are saved) and six register to register ops (for jumps, etc.). This term does not dominate so is not that important.

Math operations are integer multiply and divide, which are assumed to take 10 clock cycles. Our internal time representation is assumed to be fixed point. Thus, no floating point operations are required, however some register shifts may need to occur when performing math operations on the time quantities such as periods and slack.

TABLE 6

Assumed Cycle Times for Machine Ops

| # Clk Cycles | Instruction Type and Operations |
|---|---|
| 2 | register-to-register: jump, compare and jump on condition, load constant, add, shift, etc. |
| 10 | memory access; direct, offset and indirect |
| 10 | integer math: multiply and divide |
| 132 | call or return: 12 register saves (memory accesses) and 6 reg-to-reg ops |

TABLE 7

Instruction Counts Summary

| Algorithm | memory ops | math ops | reg-to-reg ops | call/ret |
|---|---|---|---|---|
| Acceptance_Slack | 5n + 12 | | 10n + 9 | 2 |
| Available_Slack | 9n + (3 + n)$t_k$ + 4 | 2 | 6n + (13 + 6n)$t_k$ + 9 | $t_k$ |
| Adjust_Slack_Values | $5n + 2n^2 + 4n\left\lceil\frac{T_n}{T_1}\right\rceil + 3$ | 3 · n | $9n + 2n^2 + 3n\left\lceil\frac{T_n}{T_1}\right\rceil + 2$ | 1 |

We believe our assumptions will produce results that are accurate to within an order of magnitude or better on most processors. Neither the effects of compiler optimizations nor pipelining and caching have been taken into account so our results may be pessimistic for certain processors with good optimizing compilers. Table 6 summarizes our execution time assumptions. The clock cycle estimates are based on the number of clock cycles per operation in a Pentium. In the examples we considered, the processors were in the 25 MHz range, but many current and future applications will run on 100 MHz processors and faster.

Table 7 summarizes the worst case bounds on instructions of the different types. In the examples we considered, the memory operations were the dominating terms. Note that in the general case, the execution time is the sum of the execution times of the Acceptance_Test algorithm, the Available_Slack algorithm and (at most) $\tau_k$-1 executions of Adjust_Slack_Values. Some special cases which are quite likely to occur in practice have some potentially significant performance optimizations. Let C denote the case when there are competing incremental processes (i.e. more than one incremental process). $\tilde{C}$ then indicates that only a single incremental process is present in the task set (i.e. there is no competition for slack). Similarly, let T and $\tilde{T}$ denote the existence of transformed and no transformed incremental processes, respectively. Table 8 summarizes the pieces of code that have to be executed in the presence of competing and transformed incremental processes.

When looking at Table 8, if there are no transformed incremental processes, routine Available_Slack will not call Adjust_Slack_Values since $F_{L,E_L} \geq \beta = F_{k,E_k}$ for (L≧k). (This is not immediately obvious, but can be shown.) It is clear that it is sufficient to call Available_Slack without calling the Acceptance_Test when there is a single incremental process. Lastly, if there is only a single incremental process that has not been transformed, only Available_Slack will be called, and it will not call Adjust_Slack_Values.

TABLE 8

Possible Run-Time Optimizations for Task Types

| Algorithm | (C, T) | (C, $\tilde{T}$) | ($\tilde{C}$, T) | ($\tilde{C}$, $\tilde{T}$) |
|---|---|---|---|---|
| Acceptance_Test | X | X | | |
| Available_Slack | X | X | X | X |
| Adjust_Slack-Values | X | | X | |

In addition to the computations required to compute how much slack is available, there are updates to slack accumulator values that are required when every process completes (incremental or not), including the idle process. The computational complexity of this operation is less than that of the initialize code in algorithm Available_Slack (FIG. 6), which for a 25 MHz processor is about 10 μsec (about 2.5 μsec on a 100 MHz processor). This overhead can, be systematically added to the execution times of the processes for feasibility analysis. These numbers are consistent with measurements taken at our real-time implementation of slack scheduled aperiodic processes.

Two Applications

The practicality and benefits of applying incremental RMS to two aerospace applications are considered next. The first application is a design-to-time guidance algorithm found in an article by Michael Elgersma and Blaise Morton, "A Real-Time 3D Mini-max Pursuit-Evader Algorithm" (Part 1), Final Technical Report, AFOSR Contract F49620-92-C-0057, October 1995. We hypothetically consider several configurations for this algorithm to illustrate how significant an effect period transformed incremental processes can have on the time to compute the available slack. The second application are session processes in the Central Maintenance Computing Function partition of the AIMS 777, which has considerably different task set properties.

We collected some benchmark data for a mini-max algorithm and other tasks running on the IFMU (Inertial Flight Management Unit), a tailorable avionics box sold by Honeywell. A computationally efficient 3D mini-max pursuit-evader guidance algorithm is our design-to-time task, which has as its "size" parameter the dimensions of a matrix that defines the surface area of the points where the pursuer will intercept (i.e. hit) the evader. A large maxtrix provides for a finer resolution of the intercept surface which results in a more precise guidance calculation. Only a 5×5 matrix (with 9 iterations) for modeling the intercept surface produced a mini-max compute time that resulted in a feasible schedule without slack scheduling. We consider the impacts of slack scheduling in three different system configurations.

The IFMU contains a 25 MHz I80960MC and an Embedded Computer OS (ECOS) with software for functions such I/O, scheduling and communication, basic flight control, navigation and guidance algorithms and a Kalman filter. The Kalman has a period of 5120 ms and is run in process Kalman, the flight control and scheduling run every 10 ms in process Rate 1, and the guidance and navigation are run every 40 ms in process Rate 4. Other applications can be run at various rates by putting calls to them in one of the processes defined by Rate x, where x=1, 2, 4, 8, 16 or 64. We programmed the mini-max guidance algorithm to run in process Rate 16. The periods and process names are shown in FIG. 9.

The mini-max algorithm has two players, a pursuer (missile) and an evader (aircraft). The evader wishes to maximize its time of survival while the pursuer wishes to minimize its use of fuel. In order to achieve efficient run-time performance of this guidance algorithm, both vehicles are assumed to move at (different) piece-wise constant speeds. Each vehicle has two inputs: the two components of acceleration perpendicular to the velocity vector. These inputs are also assumed to be piece-wise constant. At each guidance update, 1. Current positions and speeds of each vehicle are measured.
2. Pursuer minimizes miss distance for each possible evader acceleration. This results in a 2-dimensional intercept surface.
3. Evader maximizes some cost function over the resulting intercept surface.
4. Pursuer chooses constant normal acceleration to get to an optimal intercept point.

TABLE 9

Process Execution Times and Periods in the IFMU

| Process Name | (ms) $T_i$ | (ms) $\tilde{C}_i$ | (ms) $C_i$ | Utilization |
| --- | --- | --- | --- | --- |
| Rate 1 + exec | 10 | 2.41 | 3.03 | 24.1% |
| Rate 2 | 20 | 0.22 | | 1.1% |
| Rate 4 | 40 | 1.57 | 2.70 | 3.9% |
| Rate 8 | 80 | 0.13 | | 0.2% |
| Rate 16 + mm | 160 | 62.74 | 63.04 | 39.2% |
| Rate 64 | 640 | 0.79 | | 0.1% |
| Kalman | 5120 | 94.70 | 136.39 | 1.8% |
| Total Utilization | | | | 70.5% |
| Model A | | | | |
| Rate 4-1A | 40 | 1.57 | 2.70 | 3.9% |
| Rate 4-MMA | 40 | 15.69 | 15.76 | 39.2% |
| Model B | | | | |
| Rate 4-1B | 40 | 1.57 | 2.70 | 3.9% |
| Rate 4-MMB | 40 | 15.69 | 15.76 | 39.2% |
| Rate 64-B | | 0.00 | 0.00 | |
| Kalman-B | 160 | 2.96 | 4.26 | 1.8% |

The iterative solution technique makes an estimated 250, 000*(n/30)*(m/60) floating point operations for an n-by-m grid, modeling the space of all intercept points. The grid dimensions would be selected based on the amount of slack available at the start of the execution of each dispatch (design-to-time execution), with the minimum grid size a 5-by-5 (with 9 iterations) and a maximum (and desired) grid size of 30-by-60 (with 4 iterations).

The execution time data collection algorithm used in ECOS collects execution time data on a process only when it is the lowest rate process running in the frame. Thus, the measurement times are for sums of all higher rate processes as well. The values shown in Table 9 have been adjusted for this by subtracting off estimated execution times for the lower rate processes. This calculation should be considered as approximate for the slower rate processes, although the estimates are all based on actual measurement data. The utilization figures shown in Table 9 were computed from the IFMU data. It is assumed that every process is dispatched (or run, or updated) every period. Thus, the mini-max algorithm is updated at a rate of about 6 Hz (1/160 ms).

To compare the performance of the slack algorithms under different system configurations we first hypothesize (Model A, IFMU-MA) that the mini-max algorithm is run at Rate 4 (taking priority over any process in Rate 4), and so has a transform factor of 4, with no other changes to the task set. Since the computation time of the Adjust_Slack_Values depends on the value of $$\left\lceil \frac{T_n}{T_1} \right\rceil,$$

we next hypothesize (Model B, IFMU-MB) that the Kalman process has been transformed to run in Rate 16, and that Rate 64 is removed (since it had no known function). The results of our experiments are shown in Table 10. The clock cycles were computed using the expressions found in Table 7, where the values of the process periods, number of tasks and transform factors are defined by the application task sets. All execution times in Table 10 are computed assuming a 25 MHz processor clock speed.

TABLE 10

Slack Overheads Results for Mini-Max

| Appl. | n | $\left\lceil \frac{T_n}{T_1} \right\rceil$ | tk | clock cycles | exec time | ovhd per inc |
| --- | --- | --- | --- | --- | --- | --- |
| IFMU | 7 | 512 | 1 | 1134 | 45 μs | 0.1% |
| IFMU-MA | 7 | 512 | 4 | 666728 | 27 ms | 42.7% |
| IFMU-MB | 5 | 16 | 4 | 21524 | 861 μs | 1.4% |

In the original IFMU experiment (IFMU), the time to compute slack availability is less than 1/10 of a percent of the execution time for the mini-max algorithm. The algorithm ran with a 5-by-5 grid at the average 62.74 ms execution time. If an occasional missed computation is acceptable, it would be possible to run the 5-by-5 grid in the 80 ms time frame using slack reclamation, and completing "most" of the time depending on how much variability is present in the other processes. Or an alternative design is to guarantee the 5-by-5 grid to run at least once every 160 ms, and expect it will usually run twice.

We ran the algorithm with a 6-by-6 grid and a period, of 160 ms which took about 160 ms to execute, frequently causing a timing fault. With slack reclamation and variability in the other processes, the 6-by-6 version might be run in the 160 ms frame completing "most" of the time. Note that only algorithm Available_Slack is run, with no calls being made to Adjust_Slack_Values.

To illustrate the effects of executing algorithm Adjust_Slack_Values, we hypothesized (Model A, IFMU-MA) that the mini-max algorithm had a criticality just greater than that of the process running in Rate 4, so $t_{mm}=4$, $T'_{mm}=40$ ms, and $C'_{mm}=26.79$ ms, where the subscript mm refers to mini-max. Without further modification to the task set, the execution time for Available_Slack with up to three calls to Adjust_Slack_Values is 26.79 ms. Note that it takes more time to compute the available slack than it does to execute one of the transformed pieces of the mini-max code, so the slack availability computation may not complete before being preempted by a higher priority process, which is clearly unacceptable!

To illustrate the effects of $$\left\lceil \frac{T_n}{T_1} \right\rceil$$

on the execution time of algorithm Adjust_Slack_Values, we hypothesized (Model B, IFMU-MB) that the Kalman was transformed and run in process Rate 16. Process Rate 64 was removed since it seemed to do little. Algorithm mini-max is still run at Rate 4. The execution time to compute the available slack improved by a factor of about 30, using less than 2% of the time it takes for the entire mini-max algorithm to run, a reasonable overhead.

We looked at the data set run in the Central Maintenance Computing Function (CMCF) Partition in the AIMS 777. The CMCF partition's primary function is aircraft fault checking and diagnostics. It runs in many different modes ranging from on-board diagnosis to ground-based test and maintenance. The Member System IO Executive processes are the data collectors for dozens of subsystem components, for which it samples, formats, analyzes, logs and sometimes reports status on parameter ranges. The session processes interact with the maintenance terminals, allowing real-time diagnostics of requested aircraft functions. The current implementation runs the session processes periodically. We are interested in determining if slack scheduling could allow session interactions to occur more often, and if so how much more often.

Only the worst case execution times (running on a 24 MHz processor) were available. We were told a reasonable thing to do is scale them down to 60%–75% of their worst case execution times for typical execution times. The data set is shown in Table 11, where the average compute times for the tasks with larger compute times were taken to be 75% of their budgeted maximum. This data set has many properties that might lend itself well to incremental RMS. First, slack reclamation might be significant since the high priority processes consume a large portion of the processor utilization. Second, there are several possible incremental processes (Session_1 through Session_4), all of which are non-critical functions, and whose increment would be another execution of the process itself (for more session terminal updates). The results of applying incremental RMS to the incremental processes are contained in Table 12. The clock cycles were computed using the expressions found in Table 7, where p the values of the process periods, number of tasks and transform factors are defined by the application task sets. All execution times in Table 12 are computed using a 25 MHz processor clock speed.

TABLE 11

Process Execution Times and Periods in the AIMS 777 CMCF Partition

| Process Name | $T_i$ (m) | Max $C_i$ (ms) | Max Util (%) | Avg $C_i$ (m) | Avg Util (%) |
|---|---|---|---|---|---|
| Exec_Process | 25 | 3.020 | 35 | 2.265 | 26 |
| MS_IO_Exec | 100 | 9.600 | 28 | 7.200 | 21 |
| MS_IO_Exec_2 | 200 | 11.840 | 17 | 8.880 | 13 |
| Fault_Proc_Main | 200 | 1.136 | 2 | 1.136 | 2 |
| BD_Coll_Proc | 200 | 3.286 | 5 | 3.286 | 5 |
| Session_1 | 200 | 2.317 | 3 | 2.317 | 3 |
| Session_2 | 200 | 2.217 | 3 | 2.217 | 3 |
| Session_3 | 200 | 2.217 | 3 | 2.217 | 3 |
| Session_4 | 200 | 2.217 | 3 | 2.217 | 3 |
| Total Utilization | | | 99 | | 79 |

Table 12 applies to the CMCF partition of the AIMS 777. In this task set there are nine applications, four of which could be potentially modeled as incremental processes (Session_1 through Session_4). The higher rate (and higher priority) processes also consume most of the throughput, in worst case. (I.e. the first 3 processes consume 80% of the CPU.) The incremental processes are fairly quick to execute (unlike the mini-max algorithm), so a slack availability calculation of 121 $\mu$secs is about 5% of the total compute time, even though it is almost eight times faster than the slack availability calculation for mini-max, under Model B. Overall, adding competing processes doesn't add that much overhead, since the acceptance test algorithm is in worst case linear in n.

TABLE 12

Eperimental Results of Slack Overheads for CMCF

| Application | n | $\left\lceil \frac{T_n}{T_1} \right\rceil$ | $t_k$ | clock cycles | exec time | % ovhd per inc |
|---|---|---|---|---|---|---|
| CMCF AIMS | 9 | 8 | 1 | 3026 | 121 $\mu$s | 5.46 |

The estimated average utilization in Table 11 suggests that approximately 20% of the utilization can be reclaimed over time. In other words, one might expect to see approximately 200 ms 0.20=40 ms of reclaimed slack per hyperperiod that could be applied to the session processes. Taking the session process compute time to be 2.317 ms+0.121 ms=2.438 ms (including slack request time), gives an average of $$\frac{40 \text{ ms}}{2.438 \text{ ms}} > 16$$

additional session interactions in a hyperperiod. In other words, if all sessions are active, each session might average five interactions every 200 ms when using incremental RMS, rather than a single execution when planning for worst case.

What is claimed is:
1. A method of allocating processor slack to periodic processes having process criticalities and deadlines, the method comprising:
  period transforming a periodic task set having at least one periodic process to produce at least one transformed periodic process each having a transformed rate, wherein a ranking of the transformed rate of each transformed periodic process corresponds to a ranking of the process criticality of each periodic process;

assigning a slack-level to each transformed periodic process corresponding to the ranking of the transformed rates; and allocating processor slack to the transformed periodic processes in accordance with their slack-levels, wherein slack allocated at a first slack-level will not cause any periodic process having a slack-level equal to or greater than the first slack-level to miss its deadline.

2. The method of claim 1, wherein period transforming the periodic task set comprises defining a set of transform factors having a one-to-one relationship with the periodic processes of the periodic task set, and dividing a period of each periodic process by its corresponding transform factor to produce the transformed periodic process.

3. The method of claim 1, wherein allocating processor slack further comprises at least one acceptance test algorithm responsive to requests for slack allocation at a slack-level and having a priority higher than any periodic incremental processes and any design-to-time processes of the periodic task set.

4. The method of claim 1, wherein process time-outs of each periodic process and any aperiodic processes are enforced at run-time.

5. The method of claim 4, wherein enforcing process time-outs permits missed dispatches of at least one periodic process without failure.

6. The method of claim 4, wherein a missed dispatch of at least one periodic process resulting from enforcing process time-outs is treated as a failure.

7. The method of claim 1, wherein processor slack includes at least one slack selected from the group consisting of timeline slack and reclaimed slack.

8. A method of allocating processor slack to periodic processes having process criticalities and deadlines, the method comprising:

period transforming a periodic task set having at least one periodic process to produce at least one transformed periodic process each having a transformed rate, wherein a ranking of the transformed rate of each transformed periodic process corresponds to a ranking of the process criticality of each periodic process;

assigning a slack-level to each transformed periodic process corresponding to the ranking of the transformed rates;

assigning a slack-level to any aperiodic process, wherein the assigned slack-level for an aperiodic process equals the slack-level of a transformed periodic process having the highest process criticality not greater than the process criticality of such aperiodic process; and allocating processor slack to the transformed periodic processes in accordance with their slack-levels, wherein slack allocated at a first slack-level will not cause any periodic process having a slack-level equal to or greater than the first slack-level to miss its deadline.

9. The method of claim 8, further comprising:

assigning priorities within a slack-level when there are a plurality of aperiodic processes assigned to the same slack-level.

10. The method of claim 8, wherein process time-outs of each periodic and aperiodic process are enforced at run-time.

11. The method of claim 10, wherein enforcing process time-outs permits missed dispatches of at least one periodic process without failure.

12. The method of claim 10, wherein a missed dispatch of at least one periodic process resulting from enforcing process time-outs is treated as a failure.

13. A method of scheduling periodic incremental processes, comprising:

period transforming a periodic task set having at least one periodic process to produce at least one transformed periodic process each having a transformed rate and at least one baseline component time slice, wherein a ranking of the transformed rate of each transformed periodic process corresponds to a ranking of the process criticality of each periodic process, further wherein at least one periodic process is a periodic incremental process;

assigning a slack-level to each transformed periodic process corresponding to the ranking of the transformed rates; and allocating processor slack to baseline component time slices of the at least one periodic incremental process in accordance with the slack-levels of their corresponding transformed periodic incremental processes, wherein slack allocated at a first slack-level will not cause any periodic process having a slack-level equal to or greater than the first slack-level to miss a deadline of such periodic process.

14. The method of claim 13, wherein process time-outs of each periodic process and any aperiodic processes are enforced at run-time.

15. The method of claim 13, wherein processor slack includes at least one slack selected from the group consisting of timeline slack and reclaimed slack.

16. The method of claim 13, wherein period transforming the periodic task set comprises defining a set of transform factors having a one-to-one relationship with the periodic processes of the periodic task set, and dividing a period of each periodic process by its corresponding transform factor to produce the transformed periodic process.

17. The method of claim 16, wherein at least one transform factor of the set of transform factors is 1.

18. The method of claim 13, wherein allocating processor slack to baseline component time slices of the at least one periodic incremental process comprises allocating all available slack at a slack-level to each baseline component time slice of the at least one periodic incremental process at that slack-level.

19. The method of claim 18, further comprising allocating a worst case time slice execution time to each baseline component time slice.

20. The method of claim 19, further comprising allocating unused slack at a slack-level to increments of transformed periodic incremental processes after completion of baseline components of such transformed periodic incremental processes.

21. The method of claim 13, wherein allocating processor slack further comprises at least one acceptance test algorithm responsive to requests for slack allocation at a slack-level and having a priority higher than any periodic incremental processes and any design-to-time processes of the periodic task set.

22. A method of scheduling periodic incremental processes, comprising:

period transforming a periodic task set having at least one periodic process to produce at least one transformed periodic process each having a transformed rate and at least one baseline component time slice, wherein a ranking of the transformed rate of each transformed periodic process corresponds to a ranking of the process criticality of each periodic process, further wherein at least one periodic process is a periodic incremental process;

assigning a slack-level to each transformed periodic process corresponding to the ranking of the transformed rates;

assigning a slack-level to any aperiodic process, wherein the assigned slack-level for an aperiodic process equals the slack-level of a transformed periodic process having the highest process criticality not greater than the process criticality of such aperiodic process; and allocating processor slack to baseline component time slices of the at least one periodic incremental process in accordance with the slack-levels of their corresponding transformed periodic incremental processes, wherein slack allocated at a first slack-level will not cause any periodic process having a slack-level equal to or greater than the first slack-level to miss a deadline of such periodic process.

23. The method of claim 22, further comprising:

assigning priorities within a slack-level when there are a plurality of aperiodic processes assigned to the same slack-level.

24. The method of claim 22, wherein process time-outs of each periodic and aperiodic process are enforced at run-time.

25. A method of scheduling periodic incremental processes, comprising:

period transforming a periodic task set having at least one periodic process to produce at least one transformed periodic process each having a transformed rate and at least one baseline component time slice, wherein a ranking of the transformed rate of each transformed periodic process corresponds to a ranking of the process criticality of each periodic process, further wherein at least one periodic process is a periodic incremental process and at least one periodic process is a design-to-time process;

assigning a slack-level to each transformed periodic process corresponding to the ranking of the transformed rates;

assigning a slack-level to any aperiodic process, wherein the assigned slack-level for an aperiodic process equals the slack-level of a transformed periodic process having the highest process criticality not greater than the process criticality of such aperiodic process;

allocating all available processor slack to baseline component time slices of the at least one periodic incremental process in accordance with the slack-levels of their corresponding transformed periodic incremental processes, wherein slack allocated at a first slack-level will not cause any periodic process having a slack-level equal to or greater than the first slack-level to miss a deadline of such periodic process; and allocating unused processor slack at a slack-level to increments of transformed periodic incremental processes after completion of baseline components of such transformed periodic incremental processes.

26. The method of claim 25, wherein period transforming the periodic task set comprises defining a set of transform factors having a one-to-one relationship with the periodic processes of the periodic task set, and dividing a period of each periodic process by its corresponding transform factor to produce the transformed periodic process.

27. The method of claim 25, further comprising allocating a worst case time slice execution time to each baseline component time slice.

28. The method of claim 25, wherein allocating processor slack further comprises at least one acceptance test algorithm responsive to requests for slack allocation at a slack-level and having a priority higher than any periodic incremental processes and any design-to-time processes of the periodic task set.

* * * * *